(12) United States Patent
Davis, Jr.

(10) Patent No.: US 10,229,384 B2
(45) Date of Patent: Mar. 12, 2019

(54) SYSTEM AND METHOD FOR TRACKING AUTHENTICATED ITEMS

(71) Applicant: PROVA GROUP, INC., Dallas, TX (US)

(72) Inventor: Tommy L. Davis, Jr., Florissant, MO (US)

(73) Assignee: PROVA GROUP, INC., Dallas, TX (US)

( * ) Notice: Subject to any disclaimer, the term of this patent is extended or adjusted under 35 U.S.C. 154(b) by 0 days.

(21) Appl. No.: 14/798,367

(22) Filed: Jul. 13, 2015

(65) Prior Publication Data

US 2015/0317599 A1    Nov. 5, 2015

Related U.S. Application Data

(63) Continuation of application No. 14/553,930, filed on Nov. 25, 2014, now Pat. No. 9,082,124, which is a continuation of application No. 13/556,002, filed on Jul. 23, 2012, now Pat. No. 8,898,077, which is a continuation of application No. 10/694,311, filed on
(Continued)

(51) Int. Cl.
| | |
|---|---|
| *G06Q 10/00* | (2012.01) |
| *G06F 17/30* | (2006.01) |
| *G06Q 10/08* | (2012.01) |
| *G06Q 20/32* | (2012.01) |
| *G06Q 30/00* | (2012.01) |
| *G06Q 30/06* | (2012.01) |
| *H04L 9/32* | (2006.01) |
| *G06K 17/00* | (2006.01) |

(52) U.S. Cl.
CPC ..... *G06Q 10/087* (2013.01); *G06F 17/30289* (2013.01); *G06F 17/30312* (2013.01); *G06F 17/30424* (2013.01); *G06F 17/30598* (2013.01); *G06Q 10/0875* (2013.01); *G06Q 20/3276* (2013.01); *G06Q 30/012* (2013.01); *G06Q 30/0609* (2013.01); *H04L 9/3226* (2013.01); *G06K 2017/0051* (2013.01)

(58) Field of Classification Search
CPC .......... G06Q 30/00; G06Q 30/06; H04L 9/00; G06K 2017/0045
USPC .................. 705/58; 713/176, 156; 340/572.1
See application file for complete search history.

(56) References Cited

U.S. PATENT DOCUMENTS

| | | | |
|---|---|---|---|
| 6,591,252 B1 * | 7/2003 | Young ................ | G06Q 20/204 705/17 |
| 6,839,453 B1 * | 1/2005 | McWilliam ........ | G06K 9/00154 283/70 |

(Continued)

*Primary Examiner* — Oluseye Iwarere
(74) *Attorney, Agent, or Firm* — Jackson Walker LLP; Christopher J. Rourk; Thomas B. Hayes

(57) ABSTRACT

A system for tracking an authenticated item is provided. The system includes an authentication device affixed to the item. An item registration system receives authentication device data from the authentication device and associated item data and stores the authentication device data and the associated item data. An owner registration system receives owner registration data after a buyer has acquired the item. A buyer verification system receives the authentication device data, the associated item data and the owner registration data and stores buyer verified data if the associated item data correlates to the owner registration data, such as if the external tag number or event data entered by the owner matches external tag number or event data for the item.

18 Claims, 6 Drawing Sheets

Related U.S. Application Data

Oct. 27, 2003, now Pat. No. 8,234,185, which is a continuation-in-part of application No. 10/038,292, filed on Jan. 4, 2002.

(56) References Cited

U.S. PATENT DOCUMENTS

| | | | | |
|---|---|---|---|---|
| 6,963,973 | B2* | 11/2005 | Chapman | H04L 63/08 713/168 |
| 2001/0047340 | A1* | 11/2001 | Snow | G06Q 30/06 705/58 |
| 2002/0113707 | A1* | 8/2002 | Grunes | G06F 17/30879 340/572.1 |
| 2002/0178363 | A1* | 11/2002 | Ambrogio | G07D 7/004 713/176 |
| 2003/0050891 | A1* | 3/2003 | Cohen | G06Q 10/10 705/42 |
| 2003/0074556 | A1* | 4/2003 | Chapman | H04L 63/08 713/157 |
| 2004/0044596 | A1* | 3/2004 | Franks | G06Q 10/087 705/28 |
| 2004/0054888 | A1* | 3/2004 | Chester | G06Q 30/06 713/155 |
| 2004/0093497 | A1* | 5/2004 | Arangio | G06Q 20/389 713/176 |
| 2004/0140349 | A1* | 7/2004 | Shaw | G01V 15/00 235/375 |
| 2004/0172537 | A1* | 9/2004 | Baus | G06F 21/6209 713/170 |
| 2007/0219916 | A1* | 9/2007 | Lucas | G06Q 10/08 705/58 |
| 2008/0005557 | A1* | 1/2008 | Chester | G06Q 30/06 713/156 |
| 2008/0156874 | A1* | 7/2008 | Zorab | G07F 7/08 235/385 |

* cited by examiner

SYSTEM AND METHOD FOR TRACKING AUTHENTICATED ITEMS

RELATED APPLICATIONS

This application is a continuation of U.S. patent application Ser. No. 14/553,930, filed Nov. 25, 2014, now U.S. Pat. No. 9,082,124, which is a continuation of U.S. patent application Ser. No. 13/556,002, filed Jul. 23, 2012, now U.S. Pat. No. 8,898,077, which is a continuation of U.S. patent application Ser. No. 10/694,311, filed Oct. 27, 2003, now U.S. Pat. No. 8,234,185, which is a continuation-in-part of abandoned U.S. patent application Ser. No. 10/038,292, filed Jan. 4, 2002, which are hereby incorporated by reference for all purposes.

FIELD OF THE INVENTION

The present invention pertains to the field of item tracking systems, and more particularly to a system and method for tracking authenticated items that allows items to be tracked after delivery to an ultimate consumer, such as sports memorabilia or other items that appreciate over time.

BACKGROUND OF THE INVENTION

Inventory tracking systems are known in the art. Such inventory tracking systems allow inventory to be received and tracked to determine quantities on hand, when reordering is required, or to perform other suitable functions.

Although inventory tracking systems can be used to control inventory at one or several locations, such inventory tracking systems generally do not track the inventory once it has been purchased by the ultimate consumer. Thus, while an inventory tracking system may track the current state of an object, it does not track the state of an object as it changes over time after it has been delivered. Likewise, databases for tracking object ownership, such as warranty registration databases or other similar databases, generally do not track the change of state of the object. Likewise, such databases have limited functionality, and are only used to determine whether a product has been registered to receive warranty services, and to send notices to product owners when repairs that are covered under the warranty may be needed.

SUMMARY OF THE INVENTION

In accordance with the present invention, a system and method for tracking and authenticating items are provided that overcome known problems with tracking and authenticating items.

In particular, a system and method for tracking and authenticating items are provided that allow items to be tracked over time after they are acquired by a consumer, such as items that appreciate in value.

In accordance with an exemplary embodiment of the present invention, a system for tracking an authenticated item is provided. The system includes an authentication and/or tracking device, such as a Radio Frequency Identification ("RFID") tag, affixed to the item. An item registration system receives authentication and/or tracking device data from the authentication and/or tracking device (such as an external and internal RFID tag number) and associated item data (such as a description of the item, the name of an athlete that used the item, or a sporting event that the item was used at) and stores the authentication and/or tracking device data and the associated item data. An owner registration system receives owner registration data (such as owner identification data and an external tag number) after a buyer has acquired the item. A buyer verification system receives the authentication device data, the associated item data and the owner registration data and stores buyer verified data if the associated item data correlates to the owner registration data, such as if the external tag number or event data entered by the owner matches external tag number or event data for the item.

The present invention provides many important technical advantages. One important technical advantage of the present invention is a system and method for tracking and authenticating items that improve the ability to determine whether an item is authentic by tracking its history, such as prior to and after the occurrence of an event, the use of the item by a celebrity, or other suitable information.

Those skilled in the art will further appreciate the advantages and superior features of the invention together with other important aspects thereof on reading the detailed description that follows in conjunction with the drawings.

DETAILED DESCRIPTION OF PREFERRED EMBODIMENTS

Figure 1:
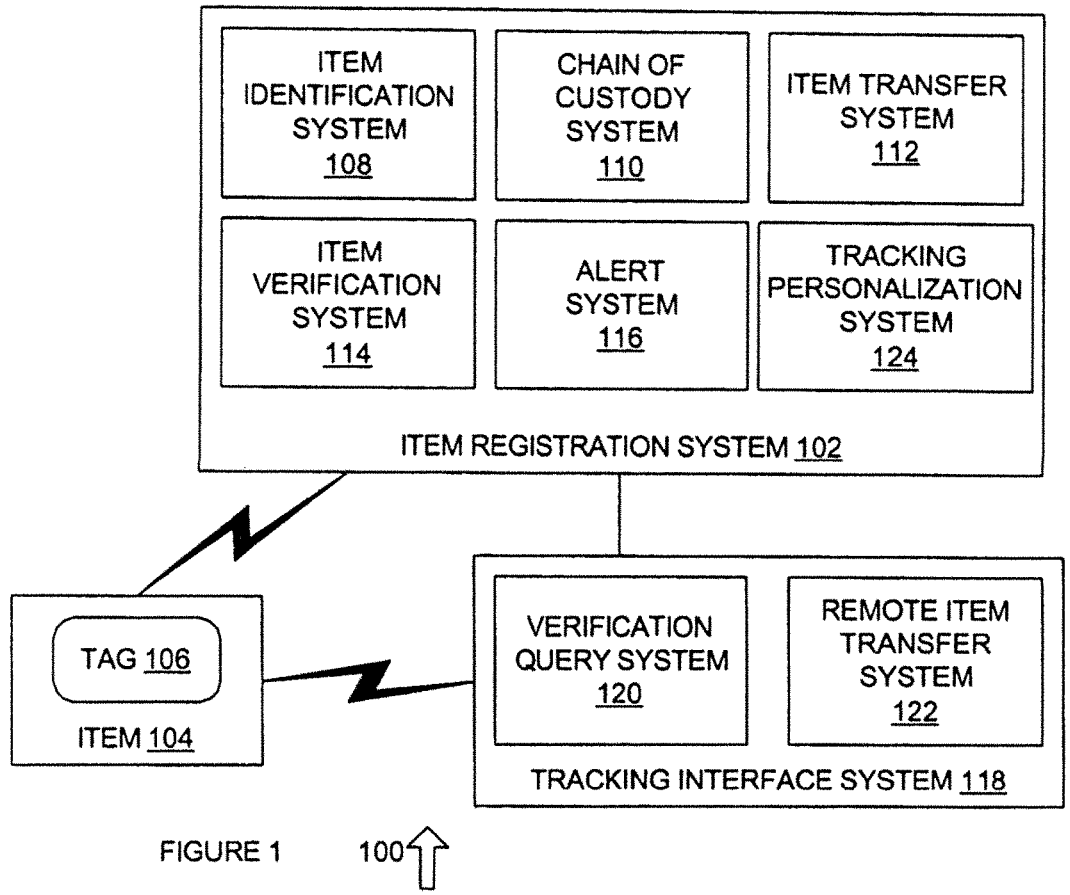
FIG. 1 is a diagram of a system for tracking an authenticated item in accordance with an exemplary embodiment of the present invention.

In the description that follows, like parts are marked throughout the specification and drawings with the same reference numerals, respectively. The drawing figures might not be to scale, and certain components can be shown in generalized or schematic form and identified by commercial designations in the interest of clarity and conciseness.

FIG. 1 is a diagram of a system 100 for tracking an authenticated item in accordance with an exemplary embodiment of the present invention. System 100 allows authenticated items to be tracked from the moment they are stored in an inventory system, after an event occurs which may cause the item to increase in value, through a chain of custody, to a first purchaser, and to subsequent purchasers.

System 100 includes item registration system 102, which can be implemented in hardware, software, or a suitable combination of hardware and software, and which can be one or more software systems operating on a general purpose server platform. As used herein, a hardware system can include discrete semiconductor devices, an application-specific integrated circuit, a field programmable gate array or other suitable devices. A software system can include one or more objects, agents, threads, lines of code, subroutines, separate software applications, user-readable (source) code, machine-readable (object) code, two or more lines of code in two or more corresponding software applications, databases, or other suitable software architectures. In one exemplary embodiment, a software system can include one or more lines of code in a general purpose software application, such as an operating system, and one or more lines of code in a specific purpose software application.

Item registration system 102 is coupled to item 104 and tag 106 by a suitable media, such as a radio frequency communications media. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. In one exemplary embodiment, systems and components are coupled to other systems and components through intervening systems and components, such as through an operating system. Communications media can be a local area network, a wide area network, a public network such as the Internet, the public switched telephone network, wireless media, fiber optic media, other suitable media, or a suitable combination of such media.

In one exemplary embodiment, item registration system 102 receives item 104 data that is input by a scanner, a barcode reader, operator input, or other suitable processes. Likewise, item registration system 102 receives data from tag 106, which can be an RFID tag, a barcode, a hologram tag, or other suitable authentication devices that may be attached to an item, provided with an item, or otherwise included with item 104. Item registration system 102 stores the tag data and the item data, and allows the item data to be tracked through inventory, distribution, and subsequently to a purchaser.

Item registration system 102 includes item identification system 108, chain of custody system 110, item transfer system 112, item verification system 114, alert system 116, and tracking personalization system 124, each of which can be implemented in hardware, software, or a suitable combination of hardware and software, and which can be one or more software systems operating on a general purpose server platform. Item identification system 108 receives authentication device data, item description data, or other suitable data, and stores the item identification data for use by other systems of item registration system 102 or tracking interface system 118. In one exemplary embodiment, item identification system 108 can scan items, read RFID tag data, receive operator entered data, receive personage data, receive item check-out and check-in data, can receive event notification data, and can receive other suitable item identification data.

Chain of custody system 110 allows the chain of custody of an item to be controlled so as to prevent the misappropriation of the item or counterfeiting of the item. In one exemplary embodiment, chain of custody system 110 can allow an entry point for an item to start an item chain of custody, can allow reseller systems to receive the item and can verify the chain of custody to an ultimate owner, can allow the owner to register the purchase of the item, and can verify that the owner has purchased the authentic item that initiated at the beginning of the chain of custody.

Item transfer system 112 allows an item to be transferred from an owner to a subsequent purchaser. In one exemplary embodiment, item transfer system 112 allows an owner to transfer the item to another purchaser by providing access control measures, confirmation procedures or other suitable processes to ensure that an item is not stolen or counterfeited.

Item verification system 114 receives query data and provides identification data for an item. In one exemplary embodiment, item verification system 114 allows the owner of an item to be identified, allows the item to be identified based on external identification data, provides item identification data in response to other suitable combinations of data, or otherwise allows an item to be verified based on entered data.

Alert system 116 generates alert data when an item transfer to an unauthorized person is attempted, when an item is received that does not match what item identification system 108 or other suitable systems indicate that the item is, or when other information is received that indicates that a fraudulent transfer or counterfeit may have occurred. Alert system 116 can generate alert data to an operator of item registration system 102, to an owner, to a prospective buyer of an item, to a personage, or other suitable persons.

Tracking personalization system 124 allows a user to create a personalized tracking portal. In one exemplary embodiment, a user can use tracking personalization system 124 to track household items, such as by applying a tag 106 to items in the household or using other suitable data already affixed to the item such as a bar code or product registration number, and then providing additional item data that is associated with the tag 106 data or other suitable data. Additional item data, such as purchase dates, purchase price, purchase location, image data of receipts, product identification data, product registration data, or other suitable data can also be provided through tracking personalization system 124.

Tracking interface system 118 includes verification query system 120 and remote item transfer system 122, each of which can be implemented in hardware, software, or a suitable combination of hardware and software, and which can be one or more software systems operating on a general purpose processor platform. Verification query system 120 receives verification query data from a user and interfaces with item registration system 102 or other suitable systems to provide verification data of an item, an owner, or other suitable data. In one exemplary embodiment, verification query system 120 can receive authentication device data from tag 106, item data from item 104 such as by scanning or in other suitable manners, operator entered data, or other suitable verification query data, and can interface with item registration system 102 to verify whether the information entered matches information stored by item registration system 102, can provide additional information depending upon the information that was requested through verification query system 120, or can perform other suitable functions.

Remote item transfer system 122 allows the owner of an item to transfer it to another owner by interfacing with item registration system 102. In one exemplary embodiment, remote item transfer system 122 allows the owner to send a subsequent purchaser suitable data to initiate a transfer, and also allows the prospective purchaser to enter data to complete the transfer. Likewise, remote item transfer system 122 can receive alert data from alert system 116 and can alert the prospective buyer, prospective seller, or other suitable persons that an inconsistency with item identification data has been detected or that other inconsistent data has been entered.

In operation, system 100 allows items to be tracked, such as items that appreciate in value due to an association of the item with some external event or personage. In one exemplary embodiment, an item can be a piece of sporting gear, musical gear, collectibles, antiques, art, or other suitable items that are used by personages in the sports or entertainment industries, such that system 100 is used to verify that the item was used at a certain event, by a certain personage, or in other suitable manners. Likewise, system 100 can be used in conjunction with memorabilia, household assets, consumer products, or other suitable items, such as to register ownership of an item, confirm that the item has not been stolen, misappropriated or counterfeited, and to otherwise ensure the authenticity of the item.

Figure 2:
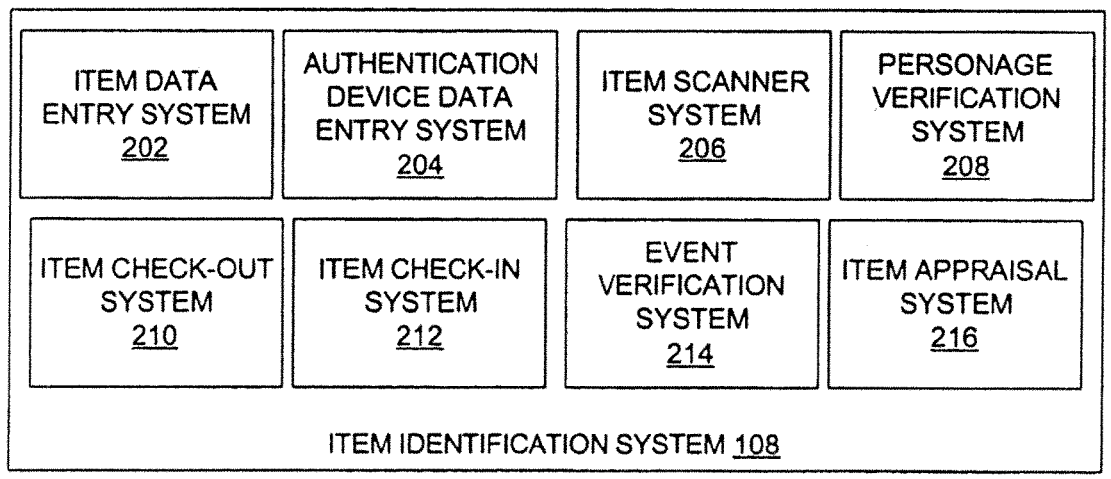
FIG. 2 is a diagram of system for providing item identification for item authentication in accordance with an exemplary embodiment of the present invention.

FIG. 2 is a diagram of system 200 for providing item identification for item tracking and authentication in accordance with an exemplary embodiment of the present invention. System 200 includes item identification system 108 and item data entry system 202, authentication device data entry system 204, item scanner system 206, personage verification system 208, item check-out system 210, item check-in system 212, event verification system 214, and item appraisal system 216, each of which can be implemented in hardware, software, or a suitable combination of hardware and software, and which can be one or more software systems operating on a general purpose server platform.

Item data entry system 202 allows an operator to enter item data. In one exemplary embodiment, item data entry system 202 can interface with inventory systems, can receive bar code data or other suitable data that correlates to a database that includes item data, can receive image data, or can otherwise receive item data for use in identifying an item.

Authentication device data entry system 204 receives authentication device data for one or more items. In one exemplary embodiment, authentication device data entry system 204 can receive data from RFID tags implanted in items, such as by scanning each item individually, on a crate, in a warehouse, or in other suitable manners. Likewise, hologram data, bar code data, or other suitable data can be used.

Item scanner system 206 receives item data from scanning devices such as optical scanners, infrared scanners, barcode scanners, or other suitable scanners. In one exemplary embodiment, item scanner system 206 can interface with item data entry system 202 and can provide item identification data from a database based on barcode data or other suitable data.

Personage verification system 208 receives personage verification data. In one exemplary embodiment, a personage can verify entry of one or more items, such as by being present when items are entered in through item data entry system 202, authentication device data entry system 204, item scanner system 206, or in other suitable manners. Personage verification system 208 can include a password, a user ID for the personage, and other suitable data, such that the personage can track the total number of items that are allocated to that personage, the location of such items, or other suitable information. For example, personage verification system 208 can be used to allow a personage to keep track of a total number of items, such that the personage can readily determine whether an unauthorized number of items is being tracked, to provide royalties to a personage based on the number of items registered through system 100, based on each time an item is transferred through system 100, or in other suitable manners.

Item check-out system 210 receives item check-out data from an authentication device, a scanner, or other suitable item check-out data, such as before an item is used at a sporting event, concert, or other suitable event. In one exemplary embodiment, an item can be checked out from an inventory control system prior to an event, such that item check-out system 210 can be used to authenticate an item that was used at the event. Image data of the item can also be generated and stored.

Item check-in system 212 receives item check-in data from an authentication device, a scanner, or other suitable item check-in data, such as after the completion of a sporting event, a concert, or other suitable event. In one exemplary embodiment, an item can be checked in from an inventory control system during or after an event, such that item check-in system 212 can be used to authenticate an item that was used at the event. Image data of the item can also be generated and stored. Alert data can also be generated if an item that has been checked out prior to an event is not returned within a predetermined period of time after the completion of the event.

Event verification system 214 receives event verification data, such as event time data, event audiovisual data, data that can only be obtained at an event venue (such as from a venue identification device), or other suitable data that can be used to identify an event or that is related to an event where an item was used. Event verification system 214 can interface with item check-out system 210 and item check-in system 212, such as to provide event data to item check-out system 210 and item check-in system 212 to allow the event verification data to be provided, or in other suitable manners. In one exemplary embodiment, event verification system 214 can also be used to provide event data to a purchaser of an item that was used in the event, such as audiovisual data of the item being checked out, used, and then checked in, audiovisual data of the item in use (such as a musical instrument), or other suitable data.

Item appraisal system 216 receives appraisal data and associates the appraisal data with an item. In one exemplary embodiment, item appraisal system 216 can include an appraiser interface, such as to allow a predetermined appraiser to enter or modify appraisal values for items. In another exemplary embodiment, item appraisal system 216 can include a user interface that allows a user to provide appraisal data such as the identity of an appraiser, an appraised value, an appraisal date, an image of an appraisal certification, or other suitable data. Item appraisal system 216 can also include an insurance company interface that allows an insurance company to provide approved appraiser data, to obtain appraisal data for items, or to obtain other suitable data.

In operation, system 200 provides item identification data that allows items to be identified and tracked. System 200 thus allows the tracking and authentication of an item to be improved, such as by providing additional measures for tracking and authentication to allow the item to be identified.

Figure 3:
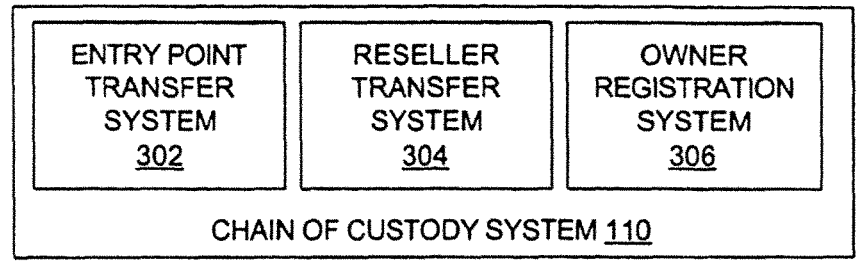
FIG. 3 is a diagram of a system for providing chain of custody control in accordance with an exemplary embodiment of the present invention.

FIG. 3 is a diagram of a system 300 for providing chain of custody control in accordance with an exemplary embodiment of the present invention. System 300 includes chain of custody system 110 and entry point transfer system 302, reseller transfer system 304, and owner registration system 306, each of which can be implemented in hardware, software, or a suitable combination of hardware and software, and which can be one or more software systems operating on a general purpose server platform.

Entry point transfer system 302 receives item identification data, authentication device data, and other suitable data at an entry point of a chain of custody. In one exemplary embodiment, the entry point can be the operator of system 100, an inventory control system, or other suitable systems. Entry point transfer system 302 can also receive data identifying a reseller that is going to receive the item from entry point transfer system 302, such as to match with data entered at the reseller transfer system 304 by the reseller.

Reseller transfer system 304 receives item authentication data, item data, entry point transfer data, reseller data from other resellers in a chain of custody, or other suitable data and compares that data to data previously entered by entry point transfer system 302, reseller transfer system 304 by other resellers, or other suitable data. In this manner, reseller transfer system 304 can be used to track an item through a chain of custody. For example, if an operator of reseller transfer system 304 enters incorrect item identification data, authentication device data, entry point data, or other related data, an alert can be generated through alert system 116, or in other suitable manners to indicate that the chain of custody for an item has been broken. Likewise, reseller transfer system 304 can be used to identify breaks in a chain of custody where counterfeit items are being introduced, where fraud is being committed, or other conditions or problems.

Owner registration system 306 receives item data, owner registration data and other suitable data and provides verification data of the acquisition of an item by an owner. In one exemplary embodiment, owner registration system 306 can be used to determine when an item has been improperly transferred, to generate alert data, or to perform other suitable functions.

In operation, system 300 allows a chain of custody to be established for items, so as to allow the item to be authenticated starting at the source of the item and continuing through all owners of the item. System 300 thus provides additional tracking and authentication capabilities for items that have been signed by personages, used at events, rare items, or even common consumer goods or other similar items.

Figure 4:
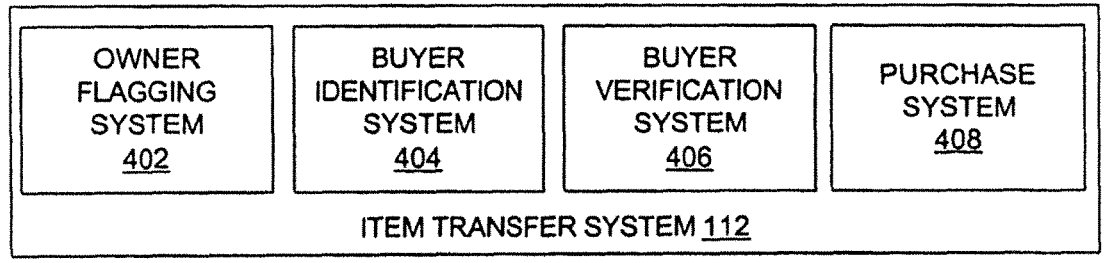
FIG. 4 is a diagram of a system for allowing an item to be transferred from an owner to another purchaser in accordance with an exemplary embodiment of the present invention.

FIG. 4 is a diagram of a system 400 for allowing an item to be transferred from an owner to another purchaser in accordance with an exemplary embodiment of the present invention. System 400 includes item transfer system 112 and owner flagging system 402, buyer identification system 404, buyer verification system 406, and purchase system 408, each of which can be implemented in hardware, software, or a suitable combination of hardware and software, and which can be one or more software systems operating on a general purpose server platform.

Owner flagging system 402 receives owner flagging data for transfer of an item. In one exemplary embodiment, an owner may have an account that includes a list of items, and can flag one or more items for transfer. Likewise, all items associated with an event or personage may be maintained on a list and items that are available for sale can be flagged in a manner that allows an owner to indicate that the item is for sale, provide an asking price, allow a prospective buyer to make an offer, or other suitable functions can be performed by owner flagging system 402.

Buyer identification system 404 receives buyer identification data from an owner or in other suitable manners. In one exemplary embodiment, buyer identification system 404 can receive an e-mail address, an account identifier, or other suitable data that identifies a buyer, such that the buyer can be contacted and requested to confirm the transfer. Likewise, buyer identification system 404 generate lockout data, such as to lockout an owner from initiating another transfer prior to verification of the transfer by the buyer or other suitable data.

Buyer verification system 406 receives buyer verification data from a buyer or in other suitable manners. In one exemplary embodiment, buyer verification system 406 can provide an e-mail message, a message to an account holder, or other suitable data that identifies a seller and an item, such that the buyer can be confirm the transfer of an item. Likewise, buyer identification system 404 can generate lockout data, such as to lockout the buyer from initiating another transfer prior to verification of receipt of payment by the seller or other suitable data.

Purchase system 408 allows authentication data, purchase data, and other suitable data for an item to be verified before completing the transfer of an item from an owner to a buyer. In one exemplary embodiment, a seller and a buyer can both be required to approve a transaction before the transfer of an item from the seller to the buyer is completed, such as to allow the seller to confirm that they have received payment for the item, to allow the buyer to confirm the authenticity of the item, and for other suitable purposes. In another exemplary embodiment, purchase system 408 can include payment functionality, such as an ACH or credit card payment processing system that allows buyers or sellers to reverse a transaction if the item data of record (such as an RFID tag number) does not match the item data for the transferred item.

In operation, system 400 allows an item to be transferred from an owner to another purchaser, such as by parties that do not have authentication device readers or in other suitable circumstances. System 400 allows the transfer of an item to be confirmed by a seller and by a purchaser, such as to provide the purchaser with sufficient time to have the item authenticated at a location with an authentication device reader, to allow the seller to confirm that payment has been received, or for other suitable purposes.

Figure 5:
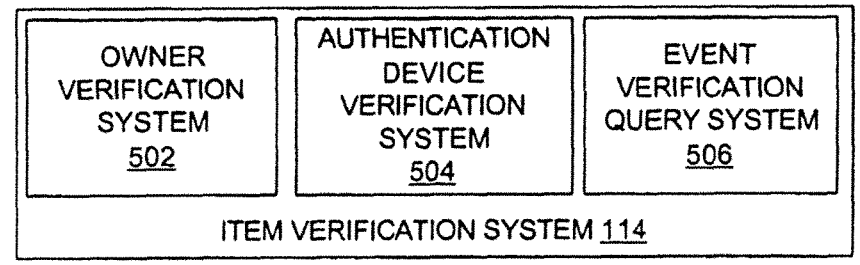
FIG. 5 is a diagram of a system for providing item verification data in accordance with an exemplary embodiment of the present invention.

FIG. 5 is a diagram of a system 500 for providing item verification data in accordance with an exemplary embodiment of the present invention. System 500 includes item verification system 114 and owner verification system 502, authentication device verification system 504, and event verification system 506, each of which can be implemented in hardware, software, or a suitable combination of hardware and software, and which can be one or more software systems operating on a general purpose server platform.

Owner verification system 502 allows owner verification data to be generated in response to owner query data. In one exemplary embodiment, purported owner identification data can be provided and a list of items owned by the owner can be returned. In another exemplary embodiment, item identification data such as a tag number, item identifier, purported event or personage data, or other suitable data can be provided, and owners of such items can be identified, such as with an indication of whether the items are for sale, the price at which the items are offered, or other suitable data.

Authentication device verification system 504 receives authentication device data or other suitable data and provides verification of the item on which the authentication device has been provided. In one exemplary embodiment, authentication device verification system 504 receives authentication device data, such as RFID tag data, hologram data, bar code data, or other suitable data, and returns item description data, owner data, or other suitable data.

Event verification query system 506 receives item data, event data, owner data, or other suitable data, and provides event verification. In one exemplary embodiment, an owner of an item may wish to only provide identification of the event at which the item was used. Likewise, a user may desire to determine whether items from a given event are available for purchase. Event verification system 506 thus allows event data to be used to identify items, and can also verify whether an item was used at a given event, whether an owner owns any items that were used at a given event, whether any such items are available for purchase, or other suitable data.

In operation, system 500 allows items to be verified, such as through an associated owner, by receiving item identification device, authentication device data, event data, or in other suitable manners.

Figure 6:
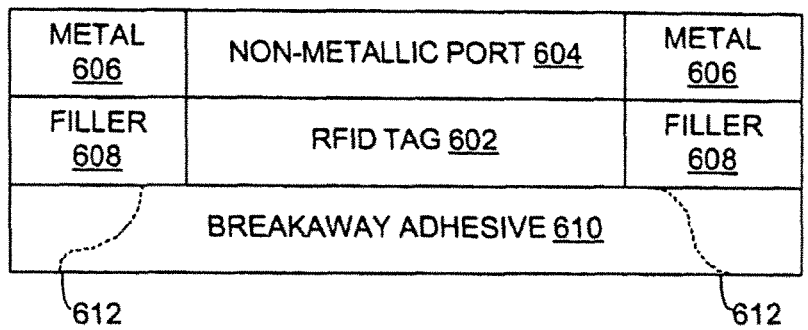
FIG. 6 is a diagram of an authentication device in accordance with an exemplary embodiment of the present invention.

FIG. 6 is a diagram of an authentication device 600 in accordance with an exemplary embodiment of the present invention. Authentication device 600 can be affixed to items, such that removal of the authentication device 600 can be detected to prevent forgery, fraud, or other problems from occurring.

Authentication device 600 includes RFID tag 602 or other suitable identification devices. Nonmetallic port 604 allows RFID tag 602 to be read without being obscured by metal 606. Metal 606 can also include a hologram or other similar information that is etched into metal 606, such that the information etched in the metal 606 can be read through an item scanner system 206, or in other suitable manners. Filler material 608 can be affixed to metal 606. RFID tag 602 can be affixed to nonmetallic port 604, such as with an adhesive, or can be separate from a nonmetallic port 604 such that it breaks away and remains attached to the surface of an item if an attempt is made to remove authentication device 600 from the item. Breakaway adhesive 610 can be affixed to filler material 608, RFID tag 602, or other suitable parts of authentication device 600, such that when an attempt is made to remove authentication device 600 from an item, breakaway adhesive 610 separates, such as at exemplary separation points 612, and leaves identifying data on the item as well as identifying information on the authentication device 600. In this manner, when an authentication device 600 is placed on an item, an attempt to remove the authentication device 600 can be detected, such as by lack of adhesion areas on the removed authentication device 600 that uniquely identify the authentication device 600, by the indications left on the original item, or in other suitable manners.

In operation, authentication device 600 increases the ability of system 100 or other suitable systems to provide item tracking and authentication by providing additional indications for determining the authenticity of an item. Authentication device 600 can be readily attached to items, and can be configured to leave an indication when removed by unauthorized personnel.

Figure 7:
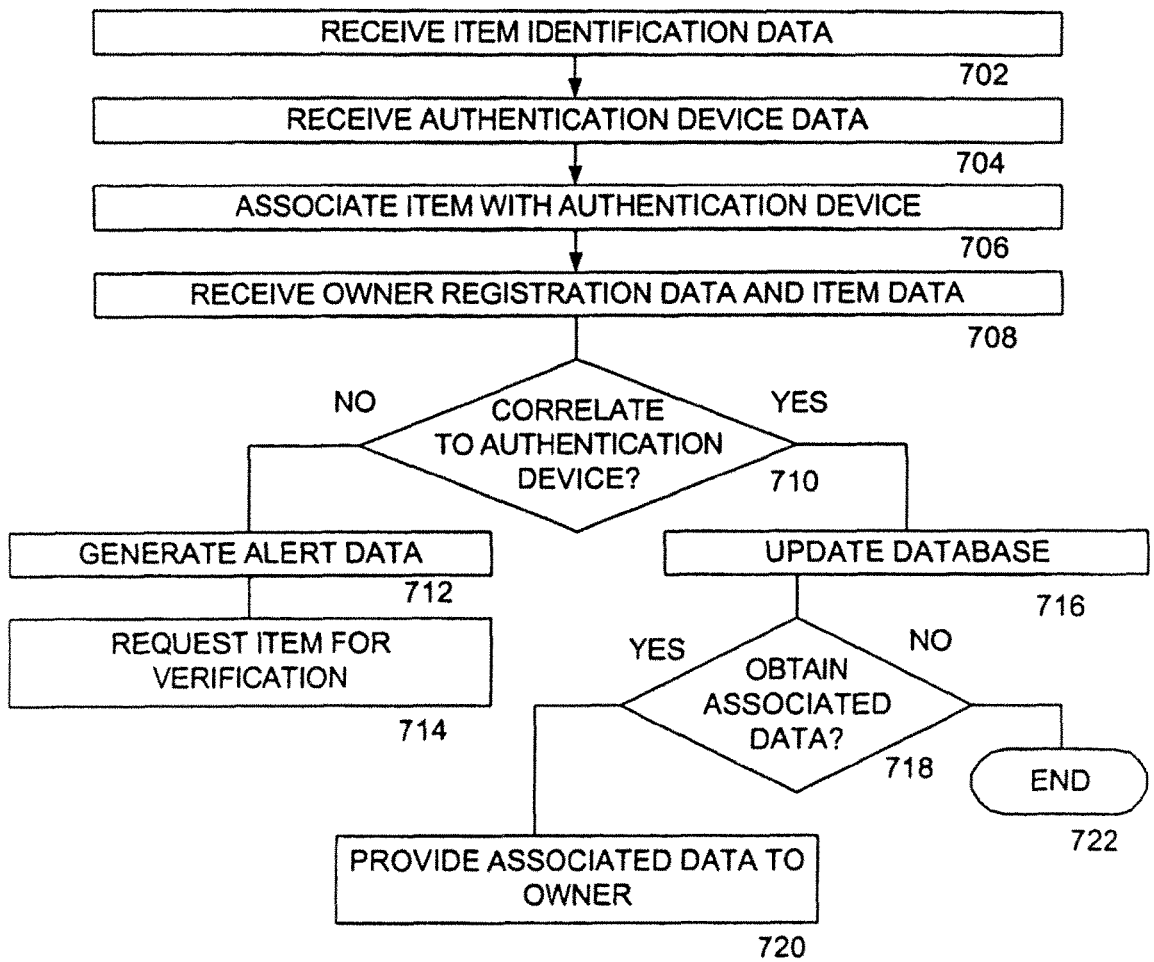
FIG. 7 is a flowchart of a method for providing authentication data for an item in accordance with an exemplary embodiment of the present invention.

FIG. 7 is a flowchart of a method 700 for providing tracking and authentication data for an item in accordance with an exemplary embodiment of the present invention. Method 700 begins at 702 where item verification data is received. In one exemplary embodiment, the item verification data can be entered by a user, received from a scanner that receives item data and correlates it to data in a database, or in other suitable manners. The method then proceeds to 704.

At 704, authentication device data is received. Authentication device data can include authentication device data from a device that is affixed to an item, that is included with an item during manufacture, or other suitable authentication devices. The method then proceeds to 706.

At 706, the item is associated with the authentication device. In one exemplary embodiment, a database can be created that stores authentication device data and associates it with item data. The method then proceeds to 708.

At 708, owner registration data and item data is received. In one exemplary embodiment, the owner registration data and item data can be received from an owner after a purchase has been made at a retail outlet, or in other suitable manners. The method then proceeds to 710.

At 710, it is determined whether to correlate the owner registration data and item data to the authentication device. In one exemplary embodiment, the owner registration data and item data can include purchase point data, event data, or other suitable data, such as where an owner purchases an item and has been told that it was used at a particular event, purchases an item from a particular location, or in other suitable manners. If it is determined that the information provided at 708 by the owner does not match stored information, the method proceeds to 712 and alert data is generated. In one exemplary embodiment, the owner can be notified that the information entered does not match the stored information for the device, that there is no information stored for the device, or other suitable data can be provided, such as actual data for the device. Likewise, alert data can be generated to an operator of system 100, a personage, a store at which the authentication device item was purchased, or other suitable data. The method then proceeds to 714 where the item is requested for verification. In one exemplary embodiment, the alert data can be generated when an indication exists that the purchaser may have performed the fraudulent activities, and the item can be requested, such as in conjunction with an offer to purchase the item, an offer for additional items, a rebate, a reward, or other suitable processes can be used to request that the item be provided for verification.

If it is determined at 710 that the authentication device should be correlated to the owner registration data, the method proceeds to 716 where a database for tracking ownership of an item is updated. The method then proceeds to 718 where it is determined whether the owner wants to obtain associated data, such as audio data, video data, audiovisual data, or other suitable data pertaining to the item. In one exemplary embodiment, audiovisual data of the event at which the item was used by a personage can be provided, audio data of an event at which the item was used in a performance can be provided, or other suitable data can be sold or otherwise provided. If it is determined that the owner does not want to obtain the associated data, the method proceeds to 722 and terminates. Otherwise, the method proceed to 720 where the data is provided to the owner.

In operation, method 700 allows items to be authenticated and tracked, so as to provide an indicia of the authenticity of an item, to allow an item to be transferred by purchases of the item, and for other suitable purposes.

Figure 8:
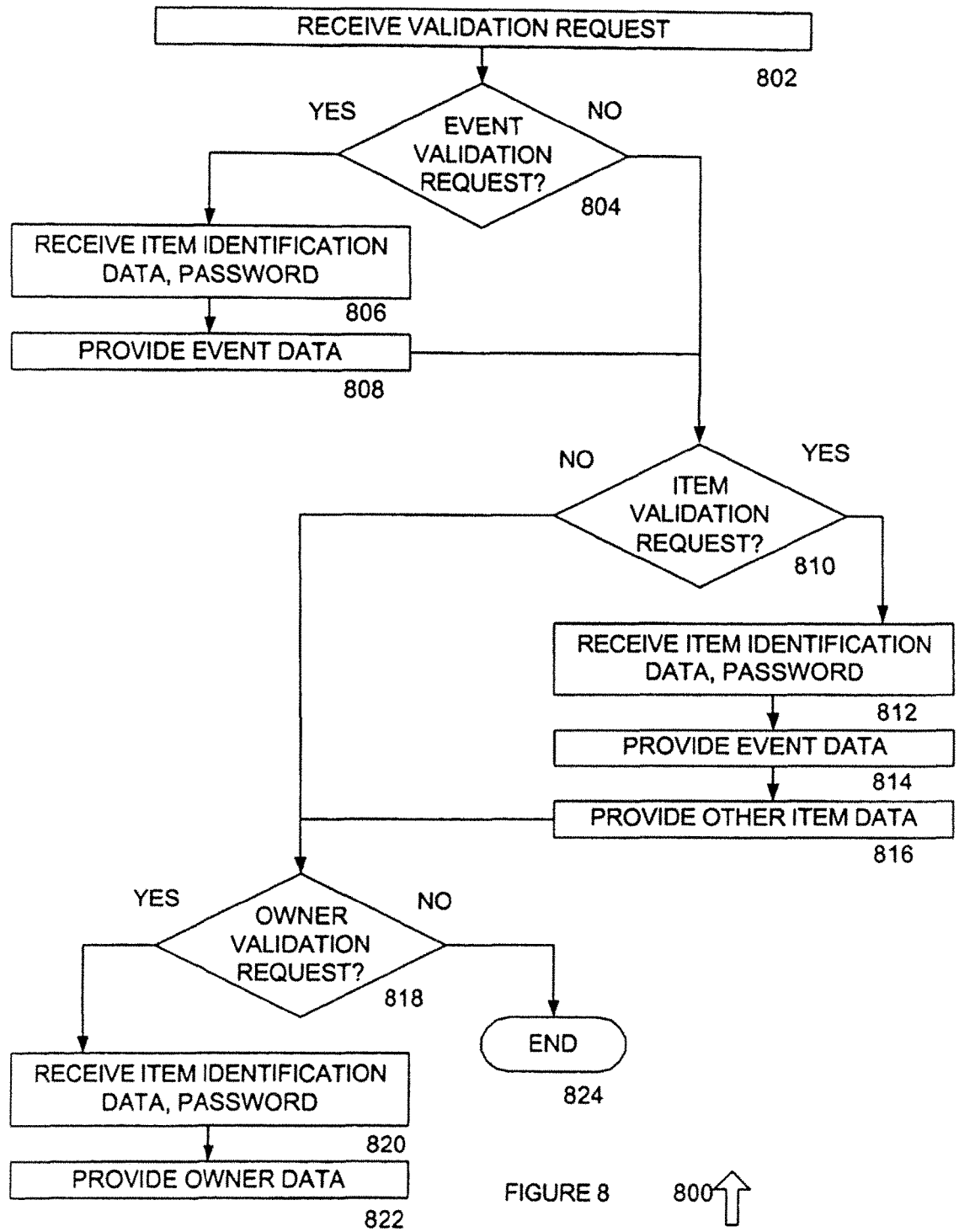
FIG. 8 is a flowchart of a method for providing validation data in accordance with an exemplary embodiment of the present invention.

FIG. 8 is a flowchart of a method 800 for providing validation data in accordance with an exemplary embodiment of the present invention. Method 800 begins at 802 where a validation request is received. In one exemplary embodiment, the validation request can be received at a store, point of purchase, over the Internet, or in other suitable manners. The method then proceeds to 804.

At 804, it is determined whether an event validation request has been received. In one exemplary embodiment, an item owner may only wish to show that an item was used at a particular sporting event and may not want to provide additional data on the item. For example, an item owner can enable others to determine that the item was used at an event, such as by providing data that is used to correlate with items used at the event. Likewise, other suitable processes can be used. If it is determined at 804 that event verification data is not required, then the method proceeds to 810. Otherwise, the method proceeds to 806 where item identification data, a password, or other suitable data is received. The method then proceeds to 808 where the event data is provided. In one exemplary embodiment, the event data can be provided to predetermined recipients of event data, can be posted on a website, can be shown on a terminal, or other suitable processes can be used. The method then proceeds to 810.

At 810, it is determined whether an item validation request has been received. In one exemplary embodiment, an item validation request can be used to identify the item, the owner, the purchase point, an event, or other suitable data. For example, an item validation can be requested when an item is being purchased or in other suitable manners. If it is determined at 810 that an item validation request has not been received, the method proceeds to 818. Otherwise, the method proceeds to 812 where item identification data, password data, or other suitable data is received. The method then proceeds to 814 where event data is provided, such as data identifying an associated event data, audiovisual data, or other suitable data. The method then proceeds to 816 where other item data is provided, such as item owner data, item description data, item origination data, item purchase price or purchase point data, or other suitable data. The method then proceeds to 818.

At 818, it is determined whether an owner validation request has been received. In one exemplary embodiment, an owner validation request can be received to determine whether an owner owns any items, the number of items owned, or other suitable information. If it is determined at 818 that an owner validation request has not been received, the method proceeds to 824 and terminates. Otherwise, the method proceeds to 820 where item identification data, password data, owner identification data, or other suitable data is received. The method then proceeds to 822 where owner data is provided, such as on a display, to one or more predetermined email addresses or accounts, or in other suitable manners. The method then proceeds to 824 and terminates.

In operation, method 800 is used to provide validation data, such as validation data to a potential purchaser of an item, validation data to viewers of the item to verify that the item is what it is alleged to be, validation data to determine the number of items available for a given event, or other suitable validation data.

Figure 9:
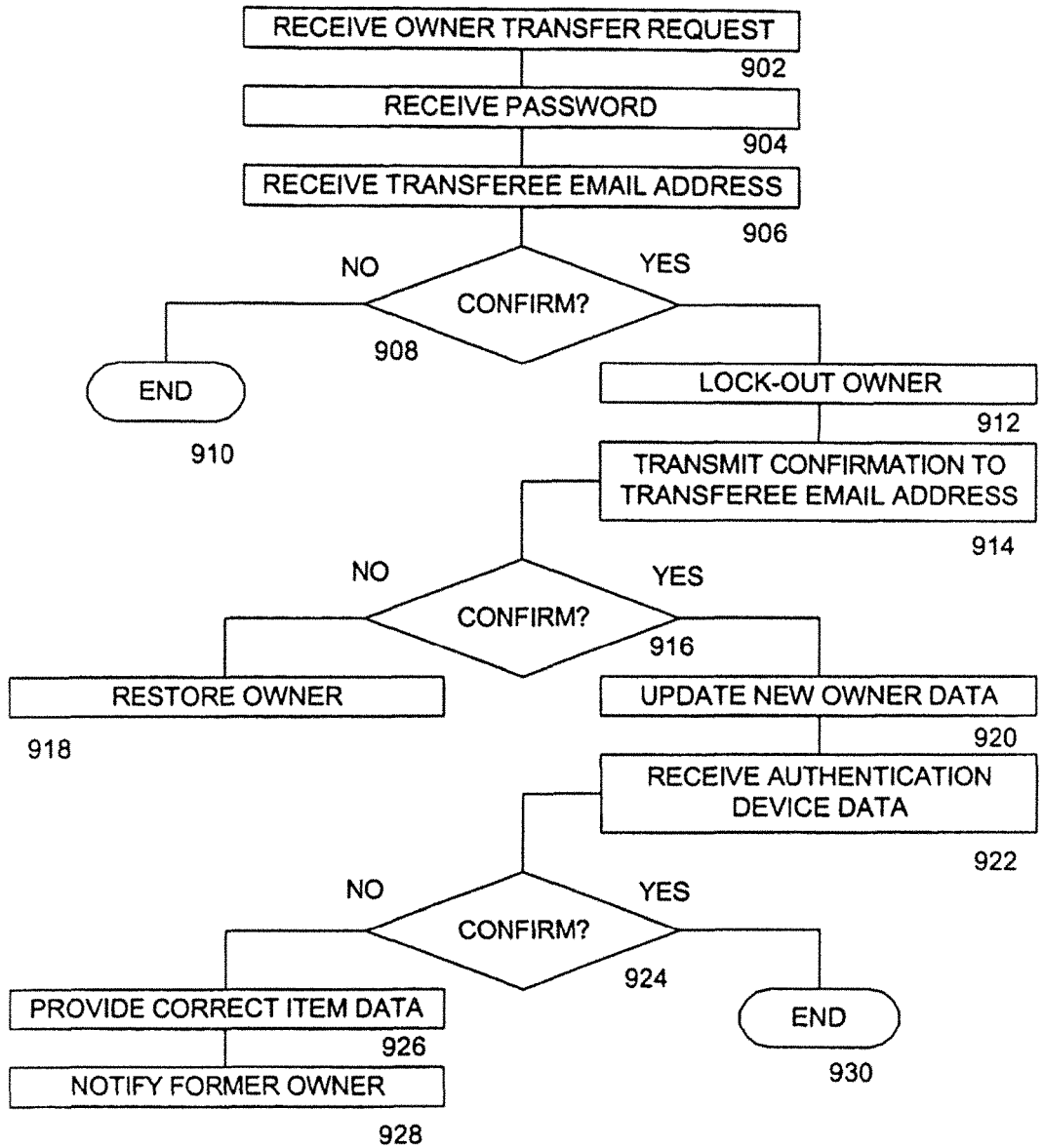
FIG. 9 is a flowchart of a method for allowing an item to be transferred in accordance with an exemplary embodiment of the present invention.

FIG. 9 is a flowchart of a method 900 for allowing an item to be transferred in accordance with an exemplary embodiment of the present invention. Method 900 begins at 902 where an owner transfer request is received. In one exemplary embodiment, the owner transfer request can include a request to enter an owner transfer area of a website, or other suitable data. The method then proceeds to 904.

At 904, a password is received. In one exemplary embodiment, the password can be a password known only to the owner, a password that must be provided by the recipient in order to complete the transfer, or other suitable passwords. The method then proceeds to 906.

At 906, a transferee e-mail address is received. Likewise, other transferee data can be received, such as a transferee account identifier where the transferee already has an account with item registration system 102 or other suitable systems. The method then proceeds to 908.

At 908, it is determined whether the password data, owner transfer request data, transferee e-mail address or account identifier data, or other suitable data has been confirmed. For example, if an owner-entered password does not match a stored password, the transaction can be terminated, an alert can be generated, or other suitable processes can be performed. Likewise, if a transferee e-mail address is not correct, the transferee account is not correct, or if other errors are detected, the method proceeds to 910 and terminates. Otherwise, the method proceeds to 912 where the owner is locked out. In one exemplary embodiment, the owner can see that the item has been made available for transfer but can be prevented from transferring the item or performing other related functions with the item. The method then proceeds to 914.

At 914, a confirmation e-mail or message is transmitted to the transferee's e-mail address, posted at the transferee's account, or other suitable processes can be performed. In one exemplary embodiment, a hypertext link to a transfer confirmation website, a payment website, or other suitable websites can be provided to a transferee by e-mail. In another exemplary embodiment, the transferee can access the transfer confirmation data at the transferee's account, at a website, or in other suitable manners. The method the proceeds to 916.

At 916, it is determined whether a confirmation of the transfer has been received. In one exemplary embodiment, a predetermined time can be allowed for a transfer to be completed by a transferee. If it is determined at 916 that confirmation has not been received, the method proceeds to 918 where the owner is restored to the item, such that the owner can control the subsequent transfer of the item or other suitable processes. Likewise, if it is determined at 916 that the transfer has been confirmed, the method proceeds to 920.

At 920, new owner data is updated. In one exemplary embodiment, owner data from an owner account can be used to populate the owner data in a database, owner data can be received from the owner by data entry, or other suitable processes can be performed. The method then proceeds to 922 where authentication device data is received. In one exemplary embodiment, the owner can send the item to an authentication device reader, can use the owner's own authentication device reader such as an RFID tag scanner or barcode scanner to read the authentication device data, or other suitable processes can be used. The method then proceeds to 924.

At 924, it is determined whether confirmation of the authentication device data has been received. In one exemplary embodiment, authentication device data and additional item identification data can be received, it can be determined whether the item identification data matches the authentication device data, such as item description data, item tag number data, event data, personage data, or other suitable processes can be performed. If it is determined at 924 that confirmation has not been received, the method proceeds to 926 where correct item data is provided, such as where the item that has been transferred may have been misrepresented, where an incorrect item has been transferred, or other suitable data. Likewise, if there is no correct item data, such as when a fraudulent device has been provided, the former owner is notified, such as when the item data is associated with an item for which an owner already owns the item, when authentication device data is associated with an item that is still registered to an owner, or other suitable processes can be performed. Likewise, if it is determined at 924 that the authentication device has been confirmed, the method proceeds to 930 and terminates.

In operation, method 900 allows a transfer to occur for a registered item between two purchasers that are not chain of custody recipients, such as resellers, or retailers. Method 900 allows owners to transfer ownership of items using commercially available computer terminals or other data reading equipment.

Figure 10:
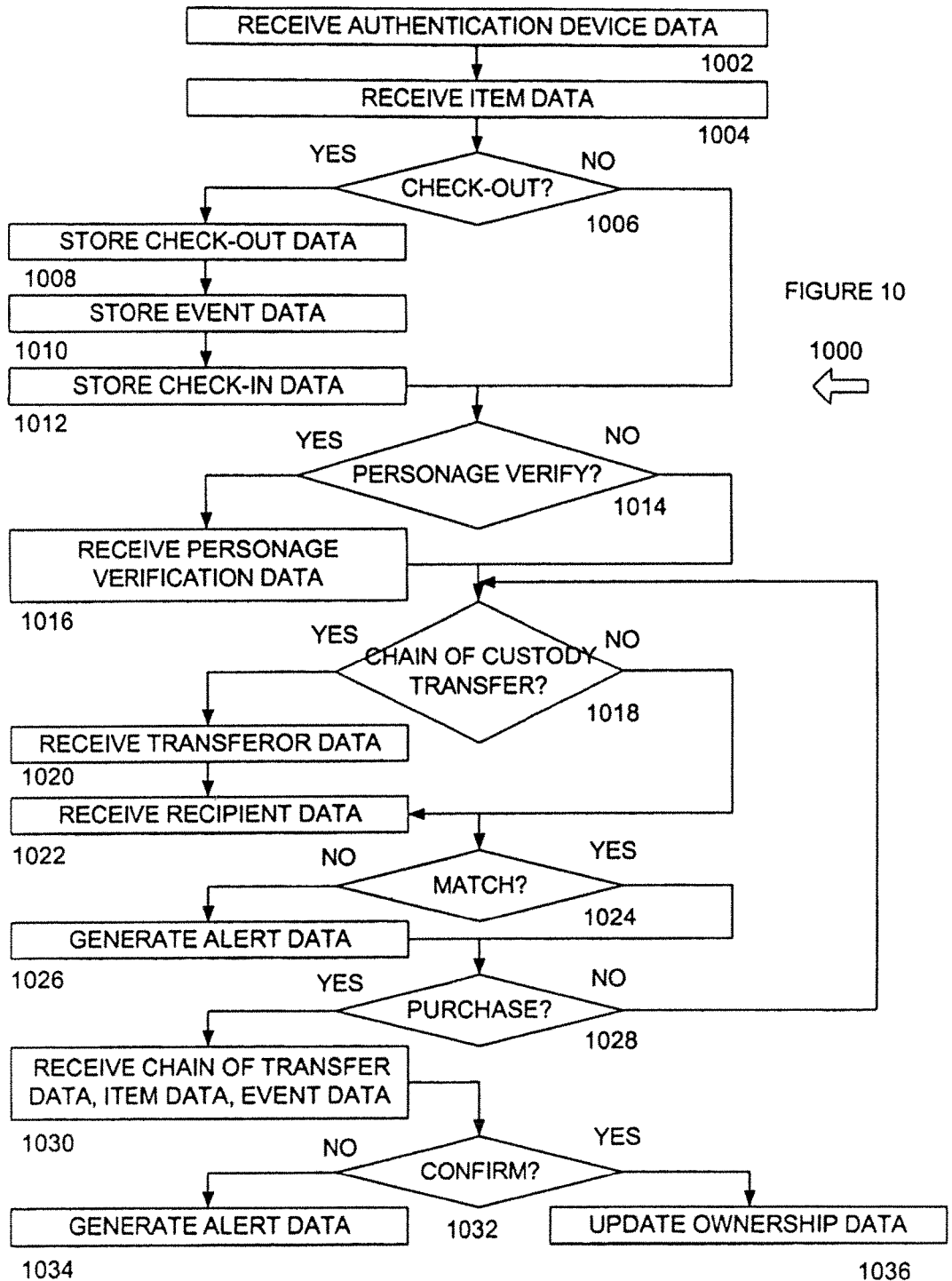
FIG. 10 is a flowchart of a method for providing chain of custody control in accordance with an exemplary embodiment of the present invention.

FIG. 10 is a flowchart of a method 1000 for providing chain of custody control in accordance with an exemplary embodiment of the present invention. Method 1000 begins at 1002 where authentication device data is received. In one exemplary embodiment, the authentication device data can be received by scanning the device or in other suitable manners. The method then proceeds to 1004.

At 1004, item data is received, such as by entering item data for a batch of items, for each individual item, by reading a barcode and associating the barcode data with data stored in a database, or in other manners. The method then proceeds to 1006.

At 1006, it is determined whether the item has been checked out. In one exemplary embodiment, items such as jerseys, footballs, helmets, guitars, drumsticks, or other suitable items can be checked out for events, such as sporting events, rock concerts, or other suitable events. If it is determined at 1006 that an item has been checked out, the method proceeds to 1008 where check-out data is stored. In one exemplary embodiment, check-out can include reading the authentication device or otherwise associating the check-out data with a specific item, storing image data of the item, or performing other suitable processes. The method then proceeds to 1010.

At 1010, event data is stored. In one exemplary embodiment, the event data can include data associated with a specific location, such as data read at a device that is stored or installed at a location, audio visual data of the event, video data of the event, graphic data of the event, audio data of the event, or other suitable event data. The method then proceeds to 1012.

At 1012, check-in data is stored, such as by storing authentication device data, image data, or other suitable data. In one exemplary embodiment, if an item is not checked in within a predetermined period of time after an event, then alert data can be generated. Likewise, after an item has been checked in, the item can be referenced to the stored event data, so as to provide a purchaser of the item with additional audio visual data or other tracking and authenticating data, to allow the purchaser to purchase the audio visual data or other types of data for an extra cost, or for other suitable purposes. The method then proceeds to 1014.

At 1014, it is determined whether personage verification is to be received. If personage verification is not to be received, the method proceeds to 1018. Otherwise, the method proceeds to 1016 where personage verification data is received. In one exemplary embodiment, a personage can have a password and user ID so that the personage can access a database and track the number of items that are associated with the personage, the types of items, the status of the items, can receive a royalty each time the items are transferred, or for other suitable purposes. The method then proceeds to 1018.

At 1018, it is determined whether a chain of custody transfer has occurred. If a chain of custody transfer has not occurred, the method proceeds to 1024. Otherwise, the method proceeds to 1020 where transfer data is received. In one exemplary embodiment, the transfer data can include identification data of the transferor, identification data for the recipient, a date of transfer, location of transfer, or other suitable data. Likewise, purchase price data, sale price data, or other suitable data can be provided. The method then proceeds to 1022 where recipient data is received. In one exemplary embodiment, the recipient data can include data identifying the transferor, data identifying the recipient, data identifying the item, the event, the personage, or other suitable data. The method then proceeds to 1024.

At 1024, it is determined whether the information entered at 1016, 1020 1022, or other suitable data matches. In one exemplary embodiment, a check can be made at a point of transfer, a chain of custody test can be performed periodically as part of an audit, or other suitable processes can be performed. If it is determined that a match does not exist between two sets of data, the method proceeds to 1026 where alert data is generated. In one exemplary embodiment, a personage can be notified that a number of items being tracked exceeds the number of authorized items, a transferor can be notified that an intended recipient has not received a transferred item, or other suitable alert data can be generated. The method then proceeds to 1028.

At 1028, it is determined whether a purchase has been performed. In one exemplary embodiment, a purchase can include a purchase by a buyer, end user, or other suitable purchasers other than intended resellers. If a purchase has not been performed, the method returns to 1018, such as where the item remains in a chain of transfer to ultimate purchasers, such as transfer between a wholesaler and a retailer, between retailers who are presently selling the item (so that a status of the item can identify that the item is available for purchase from the retailer), or other suitable data. Otherwise, the method proceeds to 1030 where the chain of transfer data, item data, event data, and other suitable data is received. For example, a purchaser can purchase an item and can enter the item data that the item is purported to embody, such as an event at which the item is purported to have been used, the personage the item is purported to have been used by, or other suitable chain of transfer data, such as at the outlet at which the item is being purchased. The method then proceeds to 1032.

At 1032, it is determined whether a confirmation is received. In one exemplary embodiment, the data entered at 1030 can be checked against previously entered data to confirm that all of the data is correct. If it is determined at 1032 that all the information is correct, the method proceeds to 1026 where ownership data is updated. Otherwise, the method proceeds to 1034 where alert data is generated. In one exemplary embodiment, the alert data can be generated to an operator of system 100 or in other suitable locations and not provided to the seller and purchaser of the item, such as where a sting-type operation is being conducted to locate sellers of fraudulent items. Likewise, other suitable alert data can be generated.

In operation, method 1000 allows a chain of custody for an item to be tracked and controlled to allow the items to be authenticated and to be transferred between an entry point, various resellers, purchasers, or other suitable persons. Likewise, method 1000 allows a personage to control the number of items that are being transferred by the system, to determine if the number of items being transferred exceeds preset limits or other suitable information.

Although exemplary embodiments of a system and method of the present invention have been described in detail herein, those skilled in the art will also recognize that various substitutions and modifications can be made to the systems and methods without departing from the scope and spirit of the appended claims.

What is claimed is:

1. A method of database management of a computing device comprising:
   electronically generating a database structure having one or more fields for each of an identification tag type and chain of custody system data;
   electronically reading identification number data from an RFID identification tag that uniquely identifies the RFID identification tag and an object;
   storing identification tag type data for the RFID identification tag in the database structure;
   storing identification number data for the RFID identification tag in the database structure;
   associating the identification number data with the identification tag type data for the identification tag;
   storing classification data in the database that identifies an item associated with the identification tag;
   processing a state identifier received from a chain of custody system;
   determining a change in state of the object;
   modifying the state identifier as a function of the change in state of the object; and
   storing the modified state identifier in the chain of custody system data field;
   wherein processing the state identifier includes determining a state of custody and generating alert data if the state of custody is broken;
   wherein the database structure comprises one or more fields for each of the identification tag type and chain of custody system data.

2. The method of claim 1 wherein the database structure having one or more fields for each of the identification tag type and the chain of custody system data comprises the database structure having one or more for each of the identification tag type and chain of custody system purchase location data.

3. The method of claim 1 wherein the database structure having one or more fields for each of the identification tag type and the chain of custody system data further comprises the database structure having one or more fields for owner registration data.

4. The method of claim 1 wherein the database structure having one or more fields for each of the identification tag type and the chain of custody system data further comprises the database structure having one or more fields for owner transfer data.

5. The method of claim 1 wherein the database structure having one or more fields for each of the identification tag type and the chain of custody system data further comprises the database structure having one or more fields for chain of custody system transfer data.

6. The method of claim 1 wherein the database structure having one or more fields for each of the identification tag type and the chain of custody system data further comprises the database structure having one or more fields for manufacturer data entry.

7. The method of claim 1 further comprising:
   generating a query for a user interface to enter owner data; and
   transmitting the owner data to a database system.

8. The method of claim 7 further comprising:
   comparing the transmitted owner data to stored owner data in the database system; and
   generating an alert if the transmitted owner data does not match the stored owner data.

9. The method of claim 1 further comprising:
   generating a query for a user interface to enter owner transfer data; and
   receiving an entry from the user interface in response to the query.

10. The method of claim 1 further comprising:
    determining whether owner registration data is present in a database system;
    generating a query for a user interface to enter the owner registration data if it is determined that owner registration data is not present in the database system; and
    receiving an entry from the user interface in response to the query.

11. The method of claim 1 further comprising:
    generating a query for a user interface to enter owner password data; and
    receiving an entry from the user interface in response to the query.

12. The method of claim 1 further comprising:
    generating a query for a user interface to enter owner transfer data;
    receiving an entry from the user interface in response to the query; and
    locking out the owner in response to the owner transfer data.

13. The method of claim 1 further comprising:
    generating a query for a user interface to enter owner transfer data that includes new owner data;
    receiving an entry from the user interface in response to the query;
    locking out the owner in response to the owner transfer data; and
    storing the new owner data in the database system.

14. The method of claim 1 further comprising:
    generating a query for a user interface to enter owner transfer data that includes new owner data;
    receiving an entry from the user interface in response to the query;
    locking out the owner in response to the owner transfer data;
    storing the new owner data in a database system; and
    storing the owner data in a previous owner chain of custody log.

15. The method of claim 1 further comprising:
    transmitting a request for supplemental item data to a database system; and
    transmitting the supplemental item data in response to the request.

16. The method of claim 1 wherein reading the identification data from the identification tag with the reader system comprises reading the identification data from the identification tag with the reader system at a chain of custody system.

17. The method of claim 16 wherein transmitting the identification data to the database system comprises transmitting the identification data to the database system from the chain of custody system.

18. A method for computer database management comprising:
- electronically generating a database structure having one or more fields for each of an identification tag type and chain of custody system data;
- electronically reading identification number data from an RFID identification tag that uniquely identifies the identification tag;
- storing identification tag type data for the RFID identification tag in a database structure;
- storing identification number data for the RFID identification tag in the database structure;
- associating the identification number data with the identification tag type data for the identification tag;
- storing classification data in the database that identifies an item associated with the identification tag;
- receiving a state identifier from a chain of custody system;
- storing the state identifier in the chain of custody system data field;
- wherein the database structure comprises one or more fields for each of an identification tag type and chain of custody system data;
- wherein the database structure having one or more fields for each of the identification tag type and the chain of custody system data comprises the database structure having one or more for each of the identification tag type and chain of custody system purchase location data;
- wherein the database structure having one or more fields for each of the identification tag type and the chain of custody system data further comprises the database structure having one or more fields for owner registration data;
- wherein the database structure having one or more fields for each of the identification tag type and the chain of custody system data further comprises the database structure having one or more fields for owner transfer data;
- wherein the database structure having one or more fields for each of the identification tag type and the chain of custody system data further comprises the database structure having one or more fields for chain of custody system transfer data;
- wherein the database structure having one or more fields for each of the identification tag type and the chain of custody system data further comprises the database structure having one or more fields for manufacturer data entry
- reading identification data from an RFID identification tag with a reader system;
- transmitting the identification data to a database system;
- querying the database system with the identification data to retrieve associated item data;
- transmitting the associated item data to the reader system;
- generating a display containing the associated item data;
- generating a query for a user interface to confirm the associated item data;
- receiving an entry from the user interface in response to the query;
- wherein receiving the entry from the user interface in response to the query further comprises receiving an alert that the associated item data does not match an item associated with the identification tag
- generating a query for a user interface to enter owner data;
- transmitting the owner data to the database system;
- comparing the transmitted owner data to stored owner data in the database system;
- generating an alert if the transmitted owner data does not match the stored owner data;
- generating a query for a user interface to enter owner transfer data;
- receiving an entry from the user interface in response to the query;
- determining whether owner registration data is present in the database system;
- generating a query for a user interface to enter the owner registration data if it is determined that owner registration data is not present in the database system;
- receiving an entry from the user interface in response to the query;
- generating a query for a user interface to enter owner password data;
- receiving an entry from the user interface in response to the query;
- generating a query for a user interface to enter owner transfer data;
- receiving an entry from the user interface in response to the query;
- locking out the owner in response to the owner transfer data;
- generating a query for a user interface to enter owner transfer data that includes new owner data;
- receiving an entry from the user interface in response to the query;
- locking out the owner in response to the owner transfer data;
- storing the new owner data in the database system;
- generating a query for a user interface to enter owner transfer data that includes new owner data;
- receiving an entry from the user interface in response to the query;
- locking out the owner in response to the owner transfer data;
- storing the new owner data in the database system;
- storing the owner data in a previous owner chain of custody log;
- transmitting a request for supplemental item data to the database system;
- transmitting the supplemental item data in response to the request;
- reading the identification data from the RFID identification tag with the reader system at a chain of custody system; and
- transmitting the identification data to the database system from the chain of custody system.

* * * * *